United States Patent [19]

Antonio et al.

[11] Patent Number: 5,679,202
[45] Date of Patent: Oct. 21, 1997

[54] PROCESS FOR REMOVING FLUOROCARBON RESIN-BASED COATINGS

[75] Inventors: Riva Dott Antonio; Pezzetti Franco, both of Milan, Italy

[73] Assignee: Smaltirva S.p.A., Bergamo, Italy

[21] Appl. No.: 519,734

[22] Filed: Aug. 28, 1995

[51] Int. Cl.⁶ .................................. B32B 35/00
[52] U.S. Cl. .................. 156/344; 156/94; 156/584; 219/121.85; 427/554; 29/426.4
[58] Field of Search ..................... 156/344, 584, 156/94; 219/121.69, 121.85; 29/402.07, 426.2, 426.4; 427/554

[56] References Cited

U.S. PATENT DOCUMENTS

| | | | |
|---|---|---|---|
| 4,054,094 | 10/1977 | Caddell et al. | 101/467 |
| 4,448,636 | 5/1984 | Baber | 219/121.85 X |
| 4,756,765 | 7/1988 | Woodroffe | 219/121.85 X |
| 5,008,513 | 4/1991 | Najafi-Sani et al. | 219/121.69 |
| 5,614,339 | 3/1997 | Tankovich | 219/121.85 X |

FOREIGN PATENT DOCUMENTS 59-73189  4/1984  Japan ................... 219/121.69

*Primary Examiner*—Mark A. Osele
*Attorney, Agent, or Firm*—Shlesinger Fitzsimmons Shlesinger

[57] ABSTRACT

A process for removing fluorocarbon resin-based coatings from a metal substratum, in which the coating is treated with a laser beam for progressively impinging on the whole coating surface until delamination of said coating from the substratum is achieved.

13 Claims, 1 Drawing Sheet

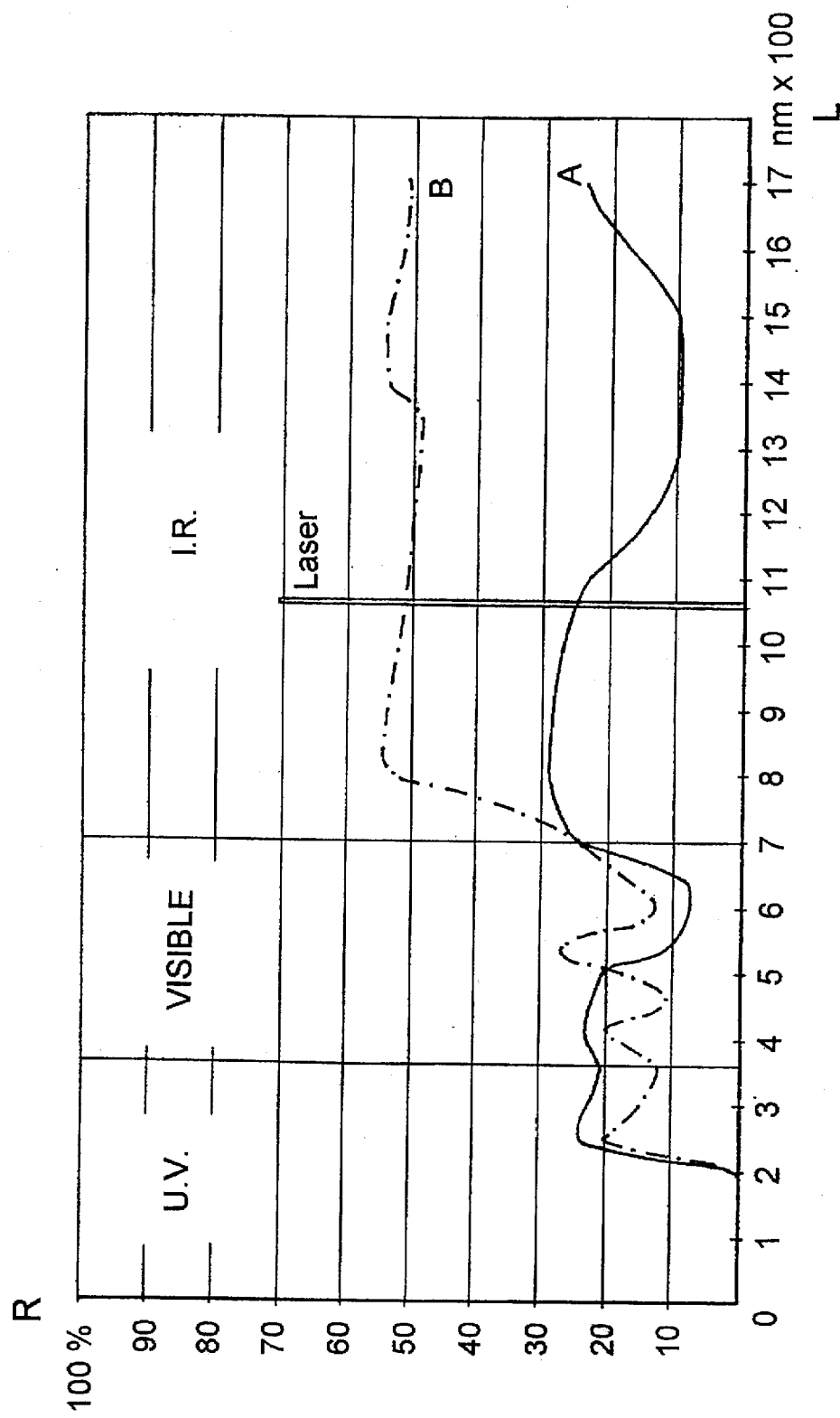

PROCESS FOR REMOVING FLUOROCARBON RESIN-BASED COATINGS

BACKGROUND OF THE INVENTION

The present invention relates to a process for removing fluorocarbon resin-based coatings from metal surfaces by means of a laser beam, without thermal degradation of the resin.

The removal procedure according to the invention is suitable for all metal parts coated with fluorocarbon resins and, particularly, for use in food and baking industries, as well as for cooking utensils, such as frypans skillet and similar items.

In the technology of coating metal surfaces intended for use in the presence of high temperatures, coatings made of layers of fluorocarbon resins are frequently used which have anti-adhesion, anti-corrosion or generally protective features.

Such coatings can be applied to metal substrata capable of bearing temperatures of at least 400° C.

A first coating layer, named "primer" is usually applied to the metal substratum previously degreased and sandblasted, said primer having the function of improving adhesion of the fluorocarbon resin to the metal. Subsequently, one or more layers of fluorocarbon resin-based products are applied, each layer being sintered in a furnace at temperatures included between 340° and 430° C.

Removal of these protection coatings is subjected to many difficulties, taking into account their features of high adhesion and resistance to high temperatures. Removal by mechanical abrasion is very heavy and difficult, due to the good physico-chemical qualities of the coating, and the use of strong treatments lead to greatly impairing the support surface itself. The use of heat until bringing the surface to the degradation temperature of the protection coating has proved to be efficient in itself. However it is a source of highly polluting products resulting from decomposition of the resin, which products cannot be dispersed in the atmosphere. This drawback greatly affects the heat-applying apparatus in terms of complexity and above all onerousness in operation.

Now it has been surprisingly found that removal can take place in a correct manner by using laser without involving heating of the layer material to such a degree that degradation of the resin will occur, along with the subsequent emission of polluting products.

It is an object of the present invention to provide a process for separating such resins applied to a metal surface according to the above method.

SUMMARY OF THE INVENTION

In view of the above object, according to the invention, a process for removing fluorocarbon resin-based coatings from a metal substratum has been envisaged in which the coating is treated with a laser beam for progressively impinging on the whole coating surface until delamination of the coating itself from the substratum is achieved. In fact, the applicant, during many laboratory tests and precise spectrographic analyses carried out on several types of coatings made of fluorocarbon resins has come to the surprising conclusion that the separation features of the resins from the substratum depend on the reflectance of the resin layer, in particular on the colour of same, wherein for "body reflectance" it is intended to mean the percent ratio of the reflected radiations to the overall amount of the radiations incident on the body itself.

In particular, when the reflectance of the resin layer in the range of the wavelengths used by the laser beam for separation of the coating layer is higher than a given range of values, the efficiency of the treatment is drastically reduced, only causing a thermal degradation of the resin, typical of known technologies.

On the contrary, if the resin layer reflectance is lower than said value range, a satisfactory separation of the coating from the substratum occurs and said coating can be easily and completely removed by a weak mechanical action. It should be noted that the application of the laser treatment causes a delamination of the coating without any coating degradation and therefore without producing polluting substances.

This effect appears to be surprising for a person skilled in the art, because it has been a deep-rooted conviction that breaking of the bonds could not be obtained without degradation of the coating, since laser was considered as an instrument involving coating heating that had to be forced until modification of the molecular structure of said coating in order to complete separation of the latter from the substratum.

The reflectance range of values under which this surprising behaviour was observed is included between 30% and 35%, preferably under 20%.

BRIEF DESCRIPTION OF THE DRAWINGS

In order to further clarify the explanation of the innovatory principles of the present invention and its advantages as compared with the known art, possible embodiments putting into practice said principles will be described hereinafter by way of non-limiting examples with the aid of the accompanying drawing, in which:

FIG. 1 is a graph showing the course of the reflectance R (reproduced in percent values on the y-axis) relative to the wavelengths L of the radiating beam (reproduced in nanometer on the x-axis) in the ultraviolet, visible and infrared spectrum, of samples of fluorocarbon resin respectively coloured blue (in solid line, denoted by A) and green (in chain dot line, denoted by B).

DETAILED DESCRIPTION OF THE INVENTION

Referring to the drawing, it can be clearly viewed that blue and green coatings have reflectance values that are considerably similar with each other in the ultraviolet spectrum (wavelengths until 360 nm) and visible spectrum (360 to 700 nm), whereas in the infrared spectrum (beyond 700 nm, until 1700 nm) the blue coating has a much lower reflectance than the green coating, that is to say that a much greater energy absorption occurs therein).

In a first example of application of the process according to the invention, these two coatings were treated with a solid state laser (YAG LASER) having a wavelength of 1060 nm, radiating energy of 550 mJ and frequency of 30 Hz. The laser emitter was kept to a distance of 30÷60 cm from the piece surface, with an angle of incidence of the beam of about 30°÷45°, and at all events lower than 60°. It has been ascertained that angles wider than 60° cause loss of efficienty in the beam action, the efficiency being on the contrary greatly independent of the distance. The coating surface was submitted to the laser action causing the point of incidence to run at a speed sufficiently low to eliminate the pulsating-nature effects of the beam, that is with a substantially constant radiated energy per unit surface.

The radiated energy per unit surface was in the range of 0.5÷2 J/cm², that is 1.4×10⁻⁷÷5.6×10⁻⁷ kWh/cm². Radiated energy values of 0.2÷4 J/cm² are also acceptable. The blue-coloured coating was delaminated by separation of the resin from the primer coating, without heat degradation. On the contrary, the green-coloured coating underwent delamination of the final transparent layer alone, whereas a remarkable heat degradation of the intermediate green layer was observed.

In the diagram of FIG. 1 it is clearly shown in what manner the reflectance value is correlated with the efficiency of the treatment by laser emission. Therefore, it results from the foregoing that for achieving a correct coating removal, it is necessary to select each time, depending on the reflectance (and thus the colour) of the coating itself, the frequency and wavelength values of the laser emission at which the reflectance of the coating which is to be removed is lower than 30%.

For coatings of some of the colours, such as blue for example, a wide frequency and wavelength range can be efficiently used; for coatings of other colours, such as green, said values must be, instead, selected from some restricted ranges of the light spectrum since the reflectance of such colours greatly varies between the ultraviolet, visibile and infrared spectrum.

With respect to separation by radiation, the primer coating can behave like the fluorocarbon resin coating, when the colour is the same, so that it is separated with the resin coating itself under sufficiently low reflectance conditions.

In a second example, the removal treatment was applied to fluoropolymer-based coatings coloured blue, grey, green and brown.

Each of said coatings was applied to substrata of stainless steel, carbon steel and aluminium, such as to baking moulds and cooking utensils, i.e. frypans etc. For application of the treatment, a solid-state Quanta System Neodymium-Yag Laser was used, having a wavelength of 1060 nm, a frequency of 20 Hz and a pulsating radiating energy of 0.3 J.

In a first series of applications the duration of the radiating pulses was fixed to 7 nanoseconds.

The application was carried out keeping the laser emitter at a distance from the coating surface included between 10 and 80 cm, with an angle of incidence to the normal of the surface itself not wider than 60°.

Treatment was carried out by radiating the whole coating surface by progressive shifting of the incidence area of the beam. The translation speed of the application area of the beam was maintained uniform and sufficiently low, so as to make the amount of the radiated energy per treated unit surface considerably constant, in spite of the pulsating nature of the beam. In particular, speed was maintained to such a value that treatment of a surface of about 10 m²/h was allowed.

At the end of the application in the treated pieces a weight loss of the coating lower than 1% was observed; this means that the heat degradation of the coating with production of fumes was substantially negligible. In this way, a complete delamination of blue, grey and green coatings was achieved. The complete removal concerned also the primer and did not involved any modifications of the metal surface, thus allowing the application of a new coating on the treated parts. On the contrary brown coatings only had a partial delamination. Further applications were carried out on the same types of coatings by using the same Neodymium-Yag laser with radiating pulses of longer duration, in the order of microseconds, all the other operating conditions being maintained unchanged. In these applications only a partial delamination was achieved and thermal degradation occurred too. Therefore, the radiating pulse duration of the laser turned out to be a decisive factor for the efficiency of the treatment by Neodymium-Yag laser.

In particular, it emerged that pulses of short duration (lower than 500 nsec, preferably included between 1 and 50 nsec) enable the surface of the pieces to be supplied with very high concentrations of energy without on the other hand causing such a heating, by Joule effect, that a thermal decomposition of the coating occurs. Vice-versa, pulses of a duration longer than 1 μsec cause coating degradation by thermal decomposition.

Experimental tests were also carried out for delaminating the same types of coatings using a pulsed TEA $CO_2$ Laser at a wavelength of 1060 nm, frequency of 40 Hz, total power of 250 W, peak power of 30 MW and pulsating radiating energy of 0.6 J.

The radiating pulse duration was fixed to 100 nanosec. The laser beam was square-shaped, with side of 28 mm. The distance from the surface and the angle of incidence of the beam were kept unchanged with respect to the preceding tests, whereas the translation speed of the application area of the beam was maintained to such a value that treatment of a 6 m² surface per hour was possible, while the radiated energy for treated unit surface was maintained substantially constant.

Higher translation speed of the application area of the beam was also used, in order to allow treatment of up to 30 m² surface per hour.

In this case, delamination of the blue, green and brown-coloured coatings was obtained, without primer removal. On the contrary, the grey-coloured coatings were not removed.

From the examples described it appears that the use of a $CO_2$ Laser allows better results in removing fluorocarbon resin-based coatings.

Obviously, the above description applying the innovatory principles of the invention is given for purposes of illustration only and therefore must not be considered as a limitation of the scope of the invention as claimed in the appended claims.

What is claimed is:

1. A process of using a laser beam for delaminating and removing a fluorocarbon resin-based coating from a metal substratum without causing thermal degradation of the coating comprising, directing onto the surface of the coating that is to be removed a laser beam having a wavelength such that the reflectance of said coating is lower than 30% of the overall laser radiation incident to said coating, moving said laser beam progressively to impinge the beam on the whole surface of said coating surface until delamination of said coating from the substratum is achieved, and removing the coating.

2. A process according to claim 1, including causing the radiated energy per unit surface of said coating to be maintained at a lower level than that which would cause heating of the coating to a point producing the molecular degradation of the resin forming said coating.

3. A process according to claim 1, characterized in that the laser beam operates with a wavelength at which the fluorocarbon coating has a reflectance lower than 20%.

4. A process according to claim 2, characterized in that during movement thereof the laser beam is applied to the coating with a substantially constant radiated energy per unit surface over the whole coating.

5. A process according to claim 4, characterized in that the radiated energy on the coating is included between 0.2 and 4 J/cm².

6. A process according to claim 1, characterized in that the laser is a $CO_2$ Laser.

7. A process according to claim 1, characterized in that the laser is a solid-state Neodymium Laser.

8. A process according to claim 1, characterized in that the laser beam is directed onto the coating surface at an angle of less than 60° to a line normal to said surface.

9. A process according to claim 1, characterized in that the laser emitter is kept to a distance of 10 to 80 cm from the coating surface.

10. A process according to claim 2, characterized in that said laser beam is a beam of pulsating radiating energy, and the duration of the radiating pulses is lower than 500 nanoseconds.

11. A process according to claim 5, wherein the radiated energy on the coating is included between 0.5 and 2 $J/cm^2$.

12. A process according to claim 9, wherein the laser emitter is kept to a distance of between 30 and 60 cm from the coating surface.

13. A process according to claim 10, wherein the duration of the radiating pulses is included between 1 and 50 nsec.

* * * * *